UNITED STATES PATENT OFFICE.

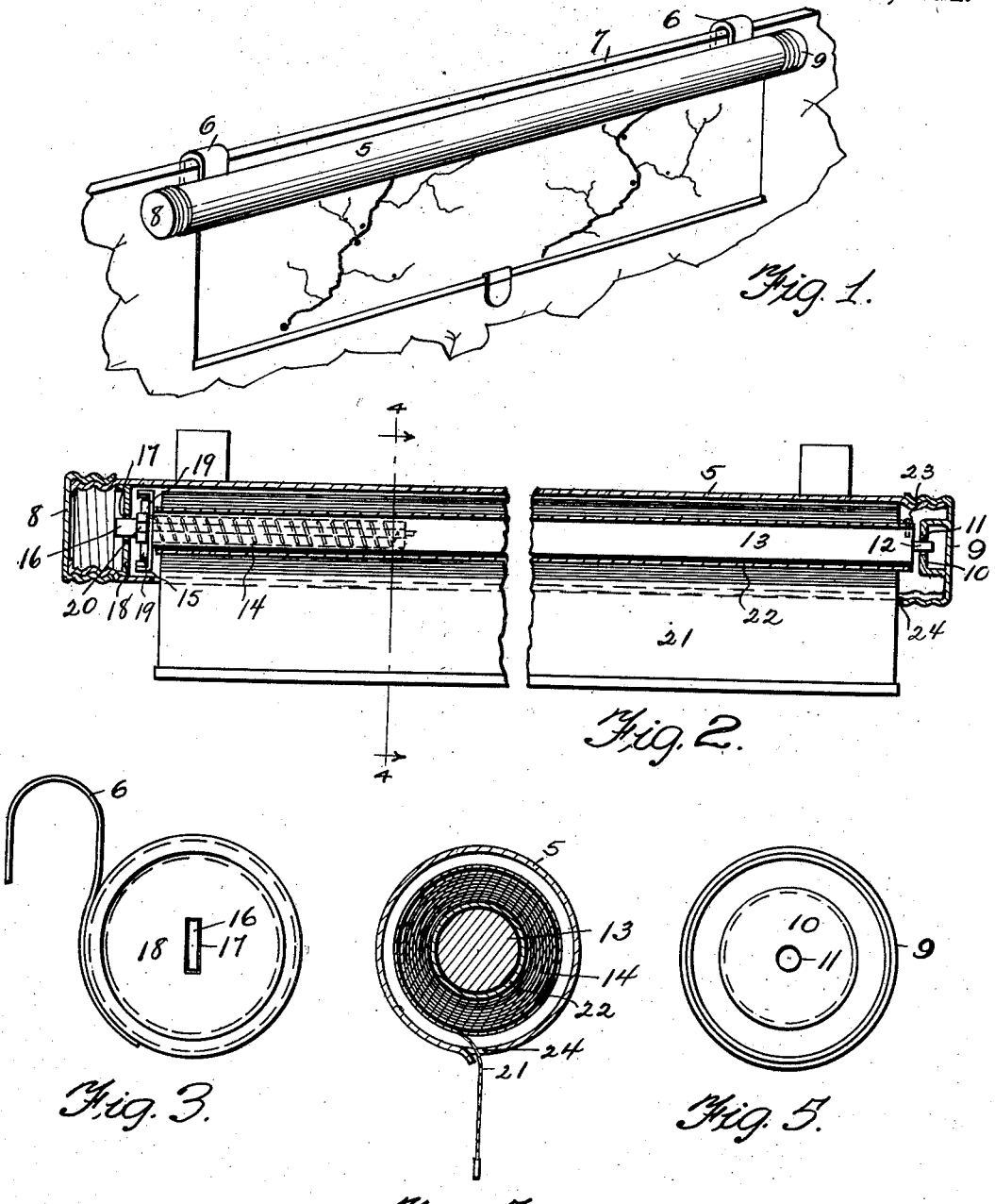

WILLIAM A. VENARD, OF OILFIELDS, CALIFORNIA; WILLIAM F. VENARD, ADMINISTRATOR OF SAID WILLIAM A. VENARD, DECEASED.

MAP-HANGER FOR AUTOMOBILES AND THE LIKE.

1,364,223.  Specification of Letters Patent.  Patented Jan. 4, 1921.

Application filed March 8, 1920. Serial No. 364,024.

*To all whom it may concern:*

Be it known that I, WILLIAM A. VENARD, a citizen of the United States, residing at Oilfields, in the county of Fresno and State of California have invented certain new and useful Improvements in Map-Hangers for Automobiles and the like, of which the following is a specification, reference being had therein to the accompanying drawings.

This invention relates to road maps for automobiles and it has for its object the provision of a simple and inexpensive device of the nature indicated adapted to be supported upon the wind shield of the automobile and to expose to the view of the driver a map of the route being traveled.

It is a further object of the invention to so construct the device that one map may be removed from the holder and another substituted therefor, easily and quickly, so that the driver may always have before him the map of the country being traveled.

Further objects and advantages of the invention will be set forth in the detailed description which now follows.

In the accompanying drawing—

Figure 1 is a perspective view of a map holder constructed in accordance with the invention;

Fig. 2 is a longitudinal vertical sectional view through the casing thereof;

Fig. 3 is an end elevation with one of the caps removed;

Fig. 4 is a transverse vertical section upon line 4—4 of Fig. 2; and

Fig. 5 is an end elevation of a bearing cap hereinafter described.

Like numerals designate corresponding parts throughout the several figures of the drawing.

Referring to the drawing it will be seen that the device comprises a tubular casing 5 having hook like clips 6 upon its back which are adapted to engage over the glass 7 of the wind shield of an automobile. Caps 8 and 9 are threaded upon the opposite ends of the body 5 and the cap 9 carries a central perforated boss 10 having an opening 11 formed therein which receives the pivot 12 of a spring actuated roller 13. This roller is actuated in the same manner that a shade roller is actuated, in other words, it contains a spring indicated at 14, one end of said spring being attached to the roller and the other end being attached to a shaft, a flattened end 16 of which engages in a slot 17 formed in a web 18 that spans the casing 5 inwardly of the cap 8. The roller 13 carries a hub 15 and this hub in turn carries the usual retaining pawls 19 that are adapted to engage in notches 20 of shaft 16 by virtue of which the map may be drawn out a short distance and then stopped in the same way that a shade roller may be stopped at varying points. The map 21 is not connected directly to the roller 13 but upon the contrary is carried by a separate sleeve 22 that is adapted to be slipped upon the roller 13 and to be held there by a set screw 23. The casing 5 is provided with a slot 24 which extends throughout its length and with the cap 9 removed it is possible to withdraw the map, the sleeve 22 and the roller 13 as an entirety. By then removing the set screw 23 it is possible to slip the sleeve 22 with the map from the roller 13 and to substitute another sleeve and map therefor. The substituted sleeve, map and roller 13 may then be slipped into the casing and when the cap 9 is screwed upon the end of the casing a bearing is provided for the right hand end of the roller and all of the parts are held in assembled relation it being understood that when the sleeve and roller are slipped into the casing the flattened end 16 of the shaft enters the slot 17 of the web 18.

It is to be understood that the invention is not limited to the precise construction set forth but that it includes within its purview whatever changes fairly come within either the terms or the spirit of the appended claims.

It is also to be understood that the invention is not limited to use upon automobiles but may be employed in any relation to which it is suited and may be made in varying sizes and finishes.

Having described my invention, what I claim is:

A device of the character described comprising a tubular casing, supporting elements carried by said casing, imperforated caps threaded upon the opposite ends of said casing and completely closing the ends of the same, a web spanning said casing adjacent one end thereof and having an elongated opening therein, a spring actuated roller comprising a shaft having a flattened end adapted to engage in the slot of said web, said casing having a slot along one side which extends to the end thereof, a bearing carried upon the inner face of the cap at the end of the casing remote from said web, a member carried by the roller and engaged in said bearing, a sleeve removably engaged with the roller and a map secured to said sleeve.

In testimony whereof I hereunto affix my signature.

WILLIAM A. VENARD.